(12) United States Patent
Dazet et al.

(10) Patent No.: US 7,384,015 B2
(45) Date of Patent: Jun. 10, 2008

(54) AIRCRAFT NOSE WITH SHIELD

(75) Inventors: Francis Dazet, Saint Alban (FR); Noël Maurens, Encausse (FR)

(73) Assignee: Airbus France SA, Toulouse (FR)

( * ) Notice: Subject to any disclaimer, the term of this patent is extended or adjusted under 35 U.S.C. 154(b) by 0 days.

(21) Appl. No.: 11/017,255

(22) Filed: Dec. 20, 2004

(65) Prior Publication Data

US 2006/0022088 A1 Feb. 2, 2006

(30) Foreign Application Priority Data

Dec. 19, 2003 (FR) .................................. 03 51152

(51) Int. Cl.
*B64C 1/00* (2006.01)
(52) U.S. Cl. .................... 244/117 R; 244/132
(58) Field of Classification Search ............ 244/117 R, 244/119, 121, 132, 133
See application file for complete search history.

(56) References Cited

U.S. PATENT DOCUMENTS

| | | | | | |
|---|---|---|---|---|---|
| 1,492,952 | A | * | 5/1924 | Bahl .......................... | 244/119 |
| 2,373,214 | A | * | 4/1945 | Wolkenhauer .............. | 359/228 |
| 2,403,195 | A | * | 7/1946 | Ross, Jr. .................... | 244/121 |
| 2,614,059 | A | * | 10/1952 | Cooper ....................... | 156/79 |
| 2,679,467 | A | * | 5/1954 | Sherts ........................ | 52/208 |
| 3,114,526 | A | * | 12/1963 | Morgan ...................... | 244/120 |
| 3,195,138 | A | * | 7/1965 | Beck ........................... | 343/872 |
| 3,261,575 | A | * | 7/1966 | Lock et al. ................. | 244/120 |
| 3,331,570 | A | * | 7/1967 | Kinnerley et al. .......... | 244/121 |
| 3,416,027 | A | * | 12/1968 | Amason et al. ............. | 315/36 |
| 3,416,758 | A | * | 12/1968 | Nicholson et al. .......... | 244/130 |
| 3,433,439 | A | * | 3/1969 | Brame et al. ............... | 244/120 |
| 3,808,600 | A | * | 4/1974 | Bourdier .................... | 343/830 |
| 3,906,308 | A | * | 9/1975 | Amason et al. ............. | 361/218 |
| 3,906,507 | A | * | 9/1975 | Allen, Jr. .................... | 343/705 |
| 3,925,783 | A | * | 12/1975 | Bleday et al. .............. | 343/705 |
| 4,051,477 | A | * | 9/1977 | Murphy et al. ............ | 343/700 MS |
| 4,240,596 | A | * | 12/1980 | Winderman et al. ....... | 244/3.16 |
| 4,275,859 | A | * | 6/1981 | Bleday ....................... | 244/121 |
| 4,296,869 | A | * | 10/1981 | Jawad ........................ | 220/626 |
| 4,570,166 | A | * | 2/1986 | Kuhn et al. ................. | 343/872 |
| 4,728,059 | A | * | 3/1988 | Stephen et al. ............. | 244/119 |
| 4,755,904 | A | * | 7/1988 | Brick .......................... | 361/117 |
| 5,024,399 | A | * | 6/1991 | Barquet et al. ............. | 244/119 |
| 5,062,589 | A | * | 11/1991 | Roth et al. ................. | 244/117 R |
| 5,121,128 | A | * | 6/1992 | van Lidth de Jeude et al. .......................... | 343/741 |
| 5,125,600 | A | * | 6/1992 | Brumbaugh ................ | 244/121 |

(Continued)

FOREIGN PATENT DOCUMENTS

GB 555700 A 9/1943

(Continued)

*Primary Examiner*—Timothy D. Collins
*Assistant Examiner*—Benjamin P Lee
(74) *Attorney, Agent, or Firm*—Patterson, Thuente, Skaar & Christensen, P.A.

(57) ABSTRACT

A shield for a nose of a large aircraft. The shield is float-mounted on a frame of the aircraft in one embodiment. To this end, the shield and the frame are respectively provided with fingers and receptacles that engage with each other. To prevent loosening, peripheral elastic links are distributed on the rim of the shield. Through this approach, it is shown that the shield retains only about one degree of freedom relative to the frame. This degree of freedom is oriented in the direction of the fingers.

12 Claims, 2 Drawing Sheets

U.S. PATENT DOCUMENTS

| | | | |
|---|---|---|---|
| 5,129,990 A * | 7/1992 | Binnie et al. | 216/34 |
| 5,201,481 A * | 4/1993 | Hararat-Tehrani | 244/118.1 |
| 5,392,053 A * | 2/1995 | Hirata et al. | 343/700 MS |
| 5,582,365 A * | 12/1996 | Simmons | 244/130 |
| 5,626,314 A * | 5/1997 | Reynolds et al. | 244/171.7 |
| 5,662,293 A * | 9/1997 | Hower et al. | 244/133 |
| 5,691,736 A * | 11/1997 | Hunn et al. | 343/872 |
| 5,747,721 A * | 5/1998 | Speakes et al. | 89/36.11 |
| 5,820,077 A * | 10/1998 | Sutliff et al. | 244/119 |
| 5,861,860 A * | 1/1999 | Stanek et al. | 343/909 |
| 5,893,534 A * | 4/1999 | Watanabe | 244/119 |
| 5,958,557 A * | 9/1999 | Naor | 428/174 |
| 6,107,976 A * | 8/2000 | Purinton | 343/872 |
| 6,213,426 B1 * | 4/2001 | Weber et al. | 244/117 R |
| 6,213,428 B1 * | 4/2001 | Chaumel et al. | 244/119 |
| 6,411,258 B1 * | 6/2002 | Ho | 343/700 MS |
| 6,443,392 B2 * | 9/2002 | Weber et al. | 244/117 R |
| 6,558,785 B1 * | 5/2003 | Rawal et al. | 428/312.8 |
| 6,926,237 B2 * | 8/2005 | Shereyk et al. | 248/71 |
| 2002/0134887 A1 * | 9/2002 | Lin et al. | 244/53 R |
| 2004/0257261 A1 * | 12/2004 | Agler | 342/1 |
| 2005/0041362 A1 * | 2/2005 | Hall | 361/225 |

FOREIGN PATENT DOCUMENTS

| | | |
|---|---|---|
| GB | 1008551 | 10/1965 |

* cited by examiner

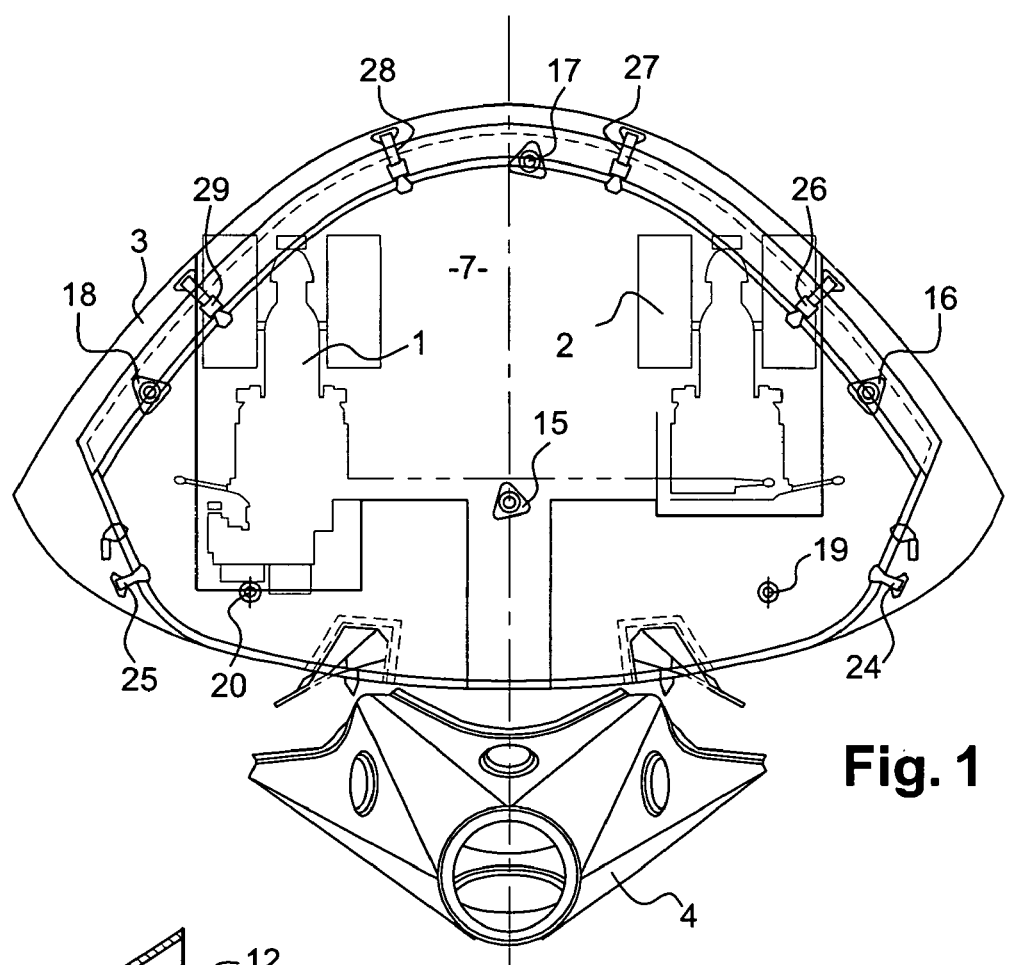
Fig. 1
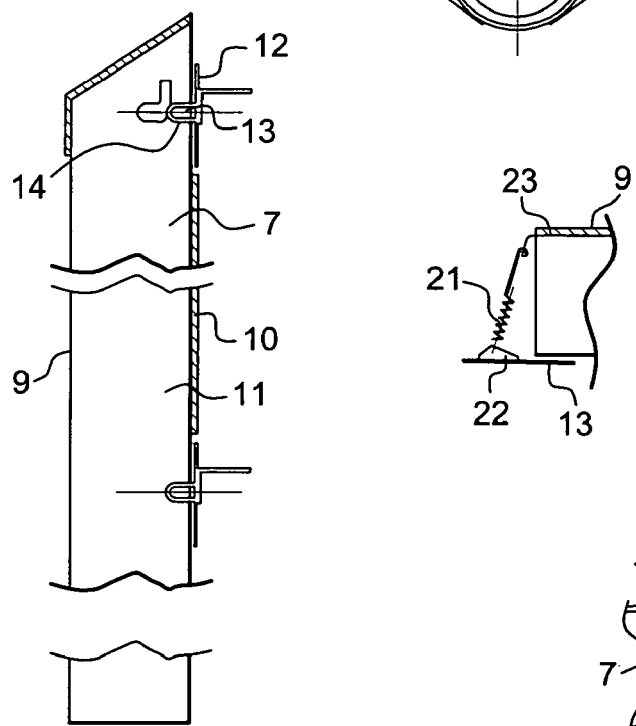
Fig. 3a
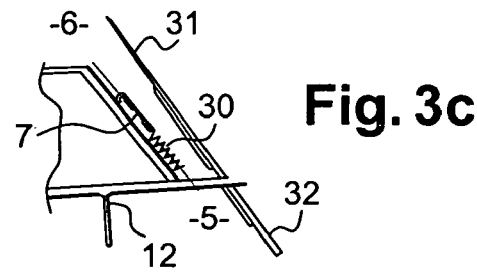
Fig. 3b
Fig. 3c

AIRCRAFT NOSE WITH SHIELD

RELATED APPLICATION

The present application claims priority to French Application No. 03 51152 filed Dec. 19, 2003.

BACKGROUND OF THE INVENTION

1. Field of the Invention

An object of the present invention is an aircraft nose comprising a protective shield. This protective shield is located between, on the one hand, a cabin or cockpit in which the pilots are located and, on the other hand, a radome in the front of the aircraft in which certain detection devices such as radar antennas are located.

It is an aim of the invention, in the case of large aircraft, to efficiently protect a cabin, a flight deck or even a vital compartment of the aircraft from frontal impact at high speed. Such projection results essentially from forceful impact by flying objects or creatures on the front of the aircraft. At high speed, the radome located in front of the aircraft is perforated in its central part by the projectile encountered, the devices inside the radome are destroyed and the projectile continues traveling up to the compartment in which the pilot or pilots are placed. The pilot or pilots may then be seriously injured. It is possible that, in the zone located beneath the floor of the cabin, facing the bay, in a vital compartment of the aircraft, there will be other devices that could be damaged by this impact. When the projectile reaches the aircraft more or less on the nose side, the inclination of the fuselage at this position averts perforation.

To prevent such accidents, a shield is interposed between, on the one hand, the cabin in which the pilot is placed or the vital compartment of the aircraft and, on the other hand, the radome of the aircraft placed in front of the aircraft.

2. Description of the Prior Art

Prior art shields are constituted in such a way as to be made in the form of assembled panels adjoining one another. Indeed, at high altitude, the atmospheric pressure is low. To avoid a situation where the aircraft passengers lack air, the cabin is tightly sealed and, because of the very low external pressure, it is deemed to be pressurized. This means that the structures of the aircraft are subjected to internal pressure forces having an effect similar to that of an inflation. This inflation is produced everywhere in the aircraft, and especially at the front of the aircraft, on a front frame of the cabin bearing the shield. This frame, which is initially plane, gets deformed. This shield structure in the form of panels is then put to use to adapt to this deformation while at the same time keeping the qualities of tight sealing and protection given by the shield.

However, for large aircraft, the shield must fulfill other functions. In particular, it must be light and resistant, and must furthermore easily lend itself to mounting and dismounting during aircraft maintenance. The standard provides that the shield must withstand impact by flying objects of a weight of four pounds launched at speeds of 180 m/second. From this viewpoint, the approach using multiple panels proves to be less efficient and less practical to implement than a rigid and resistant panel. We are then confronted with the following problem, which is that of making a large-sized rigid and resistant panel to be mounted on a structure that is itself deformable.

SUMMARY OF THE INVENTION

The invention puts forward the idea of making a rigid and resistant single-piece panel of this kind and of float-mounting it on the front frame of the aircraft. The floating is such that, when the aircraft comes to stop, and is not flying, the pressures are balanced on either side of the aircraft structure while the shield remains fully engaged in the frame of the aircraft. On the contrary, at high altitude, when the front frame of the aircraft gets deformed, the rigid shield has metal elements, in practice fingers or pins, that slide longitudinally in receptacles of the frame (or vice versa). This sliding enables a radial holding of the pins relative to an axis of sliding of these pins. As a consequence, relative to the frame, the shield has only one degree of freedom at the position of each pin, in only one direction. This approach makes it possible to obtain the desired effects. In this case, the shield no longer contributes to tight sealing which, furthermore, is completely ensured.

An object of the invention therefore is an aircraft nose comprising a protection shield located in an intermediate position between firstly a cabin in which the pilot is located, or a vital compartment of the aircraft, and secondly a radome of the aircraft placed in front of the aircraft, wherein:
  the cabin has a front cabin frame,
  the shield is unique, single-piece and rigid, and
  the rigid shield is float-mounted on this front frame.

BRIEF DESCRIPTION OF THE DRAWINGS

The invention will be understood more clearly from the following description and the accompanying figures. These figures are given purely by way of an indication and in no way restrict the scope of the invention. Of these figures:

FIG. 1 is a sectional and partially transparent front view of the shield of the invention mounted on an aircraft nose.

FIGS. 3a to 3c are cross-sectional views of details of the shield of the invention.

MORE DETAILED DESCRIPTION

Figure 2:
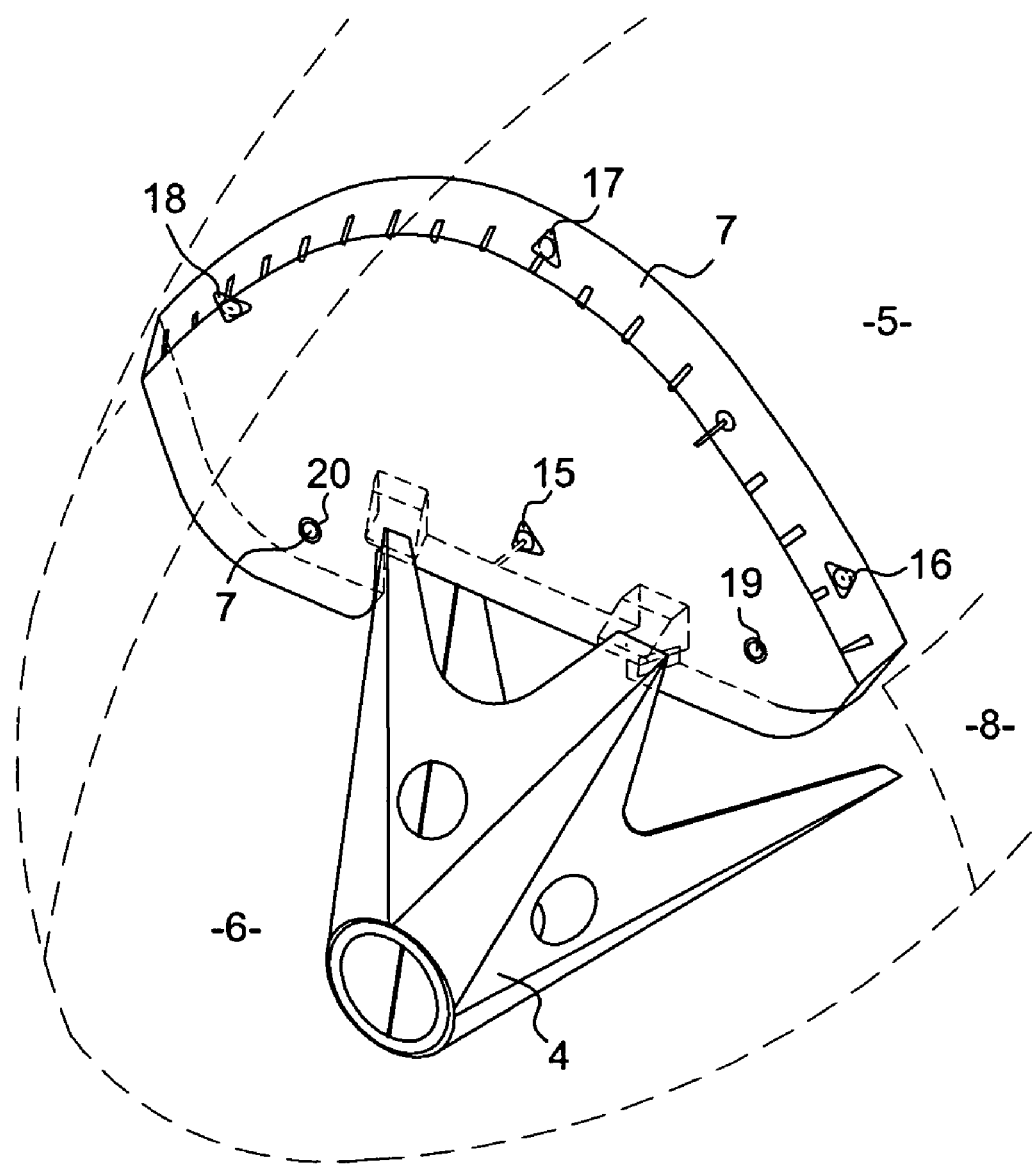
FIG. 2 is a view in perspective of the same shield.

FIG. 1 shows a part of an aircraft nose comprising a shield according to the invention. The aircraft nose proper is formed by a front dome, not shown, that takes the form of a half-shell located between FIG. 1 and the viewer of FIG. 1. Behind FIG. 1, there is also a cabin in which there is a pilot for whom positions of the pilot's seats 1 and 2 have been suggested. The fuselage 3 of the aircraft thus determines a cabin at the top part and a bay at the bottom part (not shown). In front of the shield, in the extension of the bay, there is a bracket 4 fixed to the frame of the aircraft. The bracket 4 is designed to carry radar devices located in a radome forming the bulb. FIG. 2 more clearly shows a cabin zone 5 separated from a radome zone 6 by the shield 7 of the invention. A vital compartment 8 of the aircraft is located in the cabin zone 5. The purpose of the shield 7 may be to protect the zone 5 and/or the zone 8, or the zone 5 and partially the zone 8.

In FIG. 3a, the shield 7 is preferably formed by a thick front plate 9 made of aluminum, a thin rear plate 10 made of aluminum and, between the two, a honeycomb core 11. The general rigidity can be furthermore be augmented by a bordering. The shield as shown is large-sized: its thickness is about 118 mm and its surface area is about 3 m². The thickness of the front plate 9 is preferably equal 2.4 mm, while that of the rear plate 10 is 0.8 mm, while the low-density central core of the honeycomb structure preferably has a size of 115 mm. The peripheral border may be made with filler mastic and tight-sealing products (such as polysulphide, silicon etc). The shield 7 is thus far bigger than the prior art shield panels whose elementary surface area was lower than 0.5 m².

A frame 12 of the aircraft is shown diagrammatically in FIG. 3a. This frame 12 has the particular feature of getting deformed when the aircraft is being pressurized relative to the external air. While the shield 7 is a unique, single-piece and rigid element, the invention has come up with the idea of float-mounting it on the frame 12. To this end, the frame 12 has fingers or pins such as 13 which engaged in receptacles 14 of the shield 7, or vice versa. A receptacle 14 preferably does not go through the shield 7 from one side to the other. Its depth is limited to a value slightly greater than the height of the fingers 13. In one example, the fingers 13 have a height of 20.5 mm and a diameter of 6.35 mm. The fingers 13 are preferably coated with a layer of elastic, elastomer or rubber, with a thickness of about 5 mm. As the case may be, the fingers 13 may be mounted on the shield, and the receptacles 14 mounted on the frame 12. Similarly, the shock-absorbing layer of the cylindrical rubber seal may be placed inside receptacles 14.

When the frame gets deformed under the effect of pressurization, the distance traveled by the fingers 13 inside the receptacles 14 is about 5.5 mm. It is far smaller than the length of engagement of the fingers 13 in the receptacles 14. Preferably, the links between these two major elements, the frame and the shield, comprise, in their central part, at least three fingers fixed to the frame and three receptacles fixed to the shield. These elements hold the shield laterally and vertically in its place.

To facilitate the mounting of this bulky shield on the front of the frame, a pre-positioning is provided for on each side. This pre-positioning is achieved by general elements of the frame of the aircraft, for example reserved positions facing the bases of the bracket 4. For more precise positioning, preferably, the fingers 13 have a generally pointed shape. This shape is obtained for example by forming the end of the fingers 13 proper by a semi-sphere and placing the shock-absorbing rubber layer slightly below the main diameter of the end spherical portion of the fingers. In the example shown in FIG. 2, the shield 7 thus has four receptacles 15 to 18, one central receptacle and three peripheral receptacles, and possibly two fingers 19 and 20 at the bottom part.

The shield 7 is furthermore held on the frame 12 by a set of elastic fasteners. This set of fasteners preferably comprises at least three springs joining the front face of the shielding to the frame. This number of three springs, through the balancing of the forces, holds the shield in position. To prevent them from vibrating during flight, the invention makes advantageous use of the rubber seals that coat the ties to serve as a shock absorber by friction in the receptacles. For example, as shown in FIG. 3b, a spring 21 is fixed firstly by an anchoring 22 to the frame 13 and secondly by a lug 23 to the thick front plate 9. The fasteners such as 21 are herein placed in the low positions 24 and 25 of the shield 7. Four other fasteners 26, 27, 28 and 29, mounted in a sectional view in FIG. 3c, comprise another spring 30 that is attached, under the same conditions, firstly to the shield 7, and secondly to the frame 12. FIG. 3c is a view, in a section at the Figure itself, of the external surface 31 of the radome 6 and the external surface 32 of the cabin zone 5. Complementarily, and to avert phenomena of electrostatic discharge, the plate 9 and the plate 10 are connected to the aircraft by means of braid that can be speedily mounted on the electrical ground of the aircraft.

The shield floating link works in a very simple way. The lateral and vertical forces are taken up by the fingers and the rubber seals. The axial forces resulting from the pressurization of the aircraft are taken up by the springs which tend to place the shield 7 flat against the frame 12. When the cell is put under pressure, or during any other major application of force, the central part of the frame gets cambered frontward and the shielding is pushed in the same direction, and to the same extent as this cambering. The springs balance the shielding in its new positioning imposed by the central finger-elastomer links. By virtue of this fact, the link 15 located at the center of the frame serves as a pivot. In this way, the structure 12 is made to work only for its resistance to the general forces of the aircraft and the shield 7 remains fixed but not subjected to stress.

Since the shield is a one-piece shield, it stands up perfectly well to impact by birds. Its structure is perfectly optimized with respect to the natural forces to which the aircraft is subjected and works with flexibility. The linking principle therefore enables cohabitation between a flexible support, the frame 12, and a highly rigid single-piece shielding. All the linking elements facilitate fast mounting. The pre-positioning relieves the operators of the weight and bulkiness of the shielding.

As a variant, links using steel wire springs may be replaced by elastomer locks. As a variant again, the first sheet metal of the shielding 9 can advantageously be replaced by a titanium sheet metal of small thickness.

What is claimed is:

1. An aircraft nose comprising:
   a protection shield plate adapted for protection from frontal impact, wherein the protection shield plate is positioned intermediate an air tightly sealed front frame of a cabin zone of an aircraft and detection devices located in a radome zone of the aircraft located at a front of the aircraft, such that the front frame of the cabin zone is protected by the shield plate and the radome zone remains unprotected by the shield plate,
   wherein the shield plate comprises a single, rigid structure, and
   wherein the shield plate is operably coupled to the front frame by a floating mount, wherein one of the shield plate and the front frame comprises a set of fingers, and the other of the shield plate and the front frame comprises a set of receptacles adapted to correspondingly engage the set of fingers, and
   wherein the nose further comprises a set of elastic fasteners to operably couple the shield plate to the front frame such that the shield plate is adapted to slide as a whole longitudinally on an axis substantially parallel to the fingers and substantially perpendicular to a plane of the shield plate.

2. The aircraft nose according to claim 1, wherein the front frame is deformable, and wherein the rigid shield plate is mounted to the front frame such that the shield plate retains about one degree of freedom in a direction relative to the front frame.

3. The aircraft nose according to claim 1, wherein each finger has an overall width of about 16.35 millimeters and a depth of about 20.5 millimeters.

4. The aircraft nose according to claim 1, wherein the shield plate comprises a composite material in a honeycomb structure having a thickness of about 118 millimeters and a surface area of about 3 m².

5. The aircraft nose according to claim 1, wherein the set of fingers and the set of receptacles are lined with a layer of an elastic material.

6. The aircraft nose according to claim 5, wherein the layer of elastic material comprises an elastomer.

7. The aircraft nose according to claim 5, wherein the layer of elastic material comprises rubber.

8. The aircraft nose according to claim 5, wherein each finger of the set of fingers comprises a pointed end.

9. The aircraft nose according to claim 5, wherein the layer of elastic material has a thickness of about 5 millimeters.

10. The aircraft nose according to claim 6, wherein the shield plate includes a braid adapted for connection to an electrical ground of the aircraft.

11. The aircraft nose according to claim 7, wherein the shield includes a braid adapted for connection to an electrical ground of the aircraft.

12. The aircraft nose according to claim 8, wherein each finger of the set of fingers comprises a hemi-sphere.

* * * * *